(12) United States Patent
Yamasaki et al.

(10) Patent No.: US 7,005,174 B2
(45) Date of Patent: Feb. 28, 2006

(54) OPTICAL RECORDING MEDIUM-PRODUCING SHEET AND OPTICAL RECORDING MEDIUM

(75) Inventors: Takeshi Yamasaki, Tokyo (JP); Tomomi Yukumoto, Tokyo (JP); Sou Miyata, Matsudo (JP); Kazuya Katoh, Saitama (JP); Shin Kubota, Yokohama (JP)

(73) Assignees: LINTEC Corporation, Tokyo (JP); SONY Corporation, Tokyo (JP)

( * ) Notice: Subject to any disclaimer, the term of this patent is extended or adjusted under 35 U.S.C. 154(b) by 0 days.

(21) Appl. No.: 10/822,852

(22) Filed: Apr. 13, 2004

(65) Prior Publication Data

US 2004/0247816 A1   Dec. 9, 2004

(30) Foreign Application Priority Data

Apr. 18, 2003 (JP) ............................. 2003-114698

(51) Int. Cl.
   *B32B 3/02* (2006.01)
(52) U.S. Cl. .................. 428/64.1; 428/64.4; 428/65.2; 430/270.11
(58) Field of Classification Search .............. 428/64.1, 428/64.4, 64.5, 65.2; 430/270.11, 270.13
See application file for complete search history.

(56) References Cited

U.S. PATENT DOCUMENTS 5,962,181 A   10/1999  Daems et al.
6,764,737 B1 *  7/2004  Arakawa et al. ........... 428/64.1
6,823,528 B1 * 11/2004  Yamasaki et al. ........... 720/719
2003/0116266 A1 *  6/2003  Kitano et al. ............... 156/289

FOREIGN PATENT DOCUMENTS

EP       1 047 055 A1     10/2000
JP       A-H11-265529     9/1999

OTHER PUBLICATIONS

European Search Report from European Patent Office in European Appl. No. EP 04 25 2237 which is a counterpart European appl. of U.S. Appl. No. 10/822,852 mailed on Jul. 13, 2005.
Jianye Wen; American Institute of Physics; "Heat Capacities of Polymers", Nov. 21, 1996; Chapter 9, XP-002334522; pp 101-108.

* cited by examiner

Primary Examiner—Elizabeth Mulvaney
(74) Attorney, Agent, or Firm—Posz Law Group, PLC (57) ABSTRACT

An optical disc-producing sheet 1, which has an adhesive layer 11 having a specific heat capacity after curing of not more than 1.9 J/g·° C. at 80° C. and a protective sheet 12, is laminated onto an information recording layer 3 (a laminate of a reflecting layer 31, a dielectric layer 32, a phase change layer 33 and a dielectric layer 32') formed on an optical recording medium substrate 2. According to this optical disc, recorded information can be reproduced accurately even in the case that recording/erasure or reproduction of information has been carried out repeatedly.

19 Claims, 6 Drawing Sheets

OPTICAL RECORDING MEDIUM-PRODUCING SHEET AND OPTICAL RECORDING MEDIUM

TECHNICAL FIELD

The present invention relates to a writable optical recording medium such as a write once optical disc or a rewritable optical disc, and an optical recording medium-producing sheet that enables such an optical recording medium to be produced, and more particularly to a writable optical recording medium for which recorded information can be reproduced accurately even in the case that recording/erasure or reproduction of information has been carried out repeatedly, and an optical recording medium-producing sheet that enables such an optical recording medium to be produced.

BACKGROUND ART

Examples of writable optical recording media with which recording is carried out using light are write once optical discs for which recording can be carried out only once, and rewritable optical discs for which recording can be carried out a plurality of times by repeatedly erasing and writing; in recent years, there have been greater and greater advances in increasing recording capacity, this being by shortening the wavelength of the recording laser and using a lens having a high numerical aperture NA.

Taking the recording capacity per layer with a 12 cm diameter size as an example, with a digital versatile disc (DVD), which uses a laser of wavelength 635 to 660 nm and a objective lens having an numerical aperture NA of 0.60, a recording capacity of 4.7 GB has been achieved, and with a Blu-ray Disc, which uses a laser of wavelength 405 nm and a objective lens having an numerical aperture NA of 0.85, a recording capacity of 23 GB or more has been achieved.

A write once optical disc general has a substrate, and a writable information recording layer formed on the substrate; an organic dye material or a phase change material is used in the information recording layer.

A single-sided one-layer type writable optical recording medium is generally constituted from a substrate having an concavity-convexity pattern comprising grooves and lands, a rewritable information recording layer formed on the substrate, and a protective film bonded to the information recording layer via an adhesive layer. The rewritable information recording layer is generally constituted from a reflecting layer, a dielectric layer, a phase change layer and a dielectric layer.

Methods known for bonding the protective film and the information recording layer together include a method in which an ultraviolet curable resin is coated onto the protective film or the information recording layer, and then the protective film and the information recording layer are stuck together (Japanese Patent Application Laid-open No. 10-283683), and a method in which an acrylic adhesive layer (an adhesive sheet) having a release sheet is stuck onto the protective film or the information recording layer, the release sheet is peeled off, and the protective film and the information recording layer are stuck together via the exposed acrylic adhesive layer (Japanese Patent Application Laid-open No. 2000-67468).

Moreover, a single-sided two-layer type writable optical recording medium is generally produced by, for example, a method in which a first information recording layer (reflecting layer/dielectric layer/phase change layer/dielectric layer) is formed on a substrate having an concavity-convexity pattern, an ultraviolet curable resin is coated onto the first information recording layer, and then an concavity-convexity pattern is transferred onto the ultraviolet curable resin layer using a stamper, a second information recording layer (reflecting layer (translucent layer)/dielectric layer/phase change layer/dielectric layer) is further formed on the ultraviolet curing resin layer, and then a protective film is bonded onto the second information recording layer via an adhesive layer (as with the single-sided one-layer type) (Japanese Patent Application Laid-open No. 2000-36135).

However, with conventional writable optical recording media, there has been a problem that, if recording/erasure or reproduction of information is carried out repeatedly, then it becomes impossible to reproduce recorded information accurately. This problem has been particularly prominent in the case of using an acrylic adhesive when bonding on the protective film.

DISCLOSURE OF THE INVENTION

The present invention has been accomplished in view of such problems; it is an object of the present invention to provide a writable optical recording medium for which recorded information can be reproduced accurately even in the case that recording/erasure or reproduction of information has been carried out repeatedly, and an optical recording medium-producing sheet that enables such an optical recording medium to be produced.

To attain the above object, the present invention firstly provides an optical recording medium-producing sheet, comprising a curable layer that has a specific heat capacity after curing of not more than 1.9 J/g·° C. at 80° C., as a layer to be adjacent to an information recording layer in a writable optical recording medium (invention 1).

With a writable optical recording medium produced using such an optical recording medium-producing sheet of the present invention, recorded information can be reproduced accurately even in the case that recording/erasure or reproduction of information has been carried out repeatedly. The reason for this is thought to be as follows.

As the recording density of optical recording media is increased, the size of the irradiation spot from a laser beam irradiated onto the information recording layer is reduced, and hence the irradiation power density in a central part of the irradiation spot increases. As a result, phenomena occur such as the temperature rising more than necessary or the temperature taking a long time to drop, and it is conjectured that due to the heat caused by these phenomena, degradation of the information recording layer, or of the substrate or adhesive positioned close to the information recording layer occurs, and hence defective reproduction of recorded information arises. However, in the case that the optical recording medium-producing sheet of the present invention is used, it is thought that accumulation of heat close to the irradiation spot from the laser beam is suppressed, and hence degradation due to heat as described above is suppressed. Moreover, with a phase change material such as Gb—Sb—Te, it becomes possible to keep down the size of the melting region when forming a mark, and hence cross-erasure can be reduced. Note that the state of degradation due to heat as described above can be ascertained through changes in the jitter value.

In the case of the above invention (invention 1), the curable layer preferably has a thermal conductivity after curing of at least 0.19 W/m·K at 80° C. (invention 2). By stipulating the thermal conductivity of the curable layer in this way, the effect of suppressing thermal degradation of the above invention becomes yet better.

In the case of the above inventions (inventions 1 and 2), the information recording layer is preferably a layer made of an inorganic material or a laminate of the layers (invention 3), and is particularly preferably a laminate of a reflecting layer, a dielectric layer, a phase change layer and a dielectric layer (invention 4). In the case that the information recording layer is made of such materials, it becomes yet easier to obtain the effect of suppressing thermal degradation of the above invention.

Note that in the present specification, a 'reflecting layer' is a layer that reflects either all or part of the laser light, and thus includes a translucent film.

With the optical recording medium-producing sheet according to any of the above inventions (inventions 1 to 4), the curable layer may be formed on a protective layer (invention 5). Moreover, with the optical recording medium-producing sheet according to any of the above inventions (inventions 1 to 5), the curable layer may be a stamper-receiving layer (invention 6).

In the case of the above inventions (inventions 1 to 6), the curable layer preferably has a storage elastic modulus before curing of from $10^3$ to $10^6$ Pa, and a storage elastic modulus after curing of at least $10^6$ Pa (invention 7).

In the case of the above inventions (inventions 1 to 7), the curable layer preferably has an energy ray-curable material as a principal component thereof (invention 8). This energy ray-curable material is preferably an acrylic ester copolymer having energy ray-curable groups on side chains thereof (invention 9), and an average of side chain introduction rate of the energy ray-curable groups is preferably from 0.1 to 20 mol % (invention 10). In this case, it is preferable for the energy ray-curable groups to be unsaturated groups, and for the acrylic ester copolymer to have a weight-average molecular weight of at least 100,000 (invention 11).

In the case of the above invention (invention 8), it is preferable for the energy ray-curable material to be a mixture of an acrylic ester copolymer having energy ray-curable groups on side chains thereof, and an energy ray-curable polyfunctional monomer and/or oligomer (invention 12).

Secondly, the present invention provides a writable optical recording medium produced using an optical recording medium-producing sheet as described above (inventions 1 to 12) (invention 13).

Thirdly, the present invention provides a writable optical recording medium, comprising an information recording layer, and a layer adjacent to the information recording layer having a specific heat capacity of not more than 1.9 J/g·° C. at 80° C. (invention 14).

In the case of the above invention (invention 14), the layer adjacent to the information recording layer preferably has a thermal conductivity of at least 0.19 W/m·K at 80° C. (invention 15).

In the case of the above inventions (inventions 14 and 15), the writable optical recording medium may further comprise a protective layer, with the layer adjacent to the information recording layer being an adhesive layer that bonds the information recording layer and the protective layer together (invention 16), or the layer adjacent to the information recording layer may be a stamper-receiving layer, with the information recording layer being formed on at least one side of the stamper-receiving layer (invention 17).

In the case of the above inventions (inventions 14 to 17), the information recording layer is preferably a layer made of an inorganic material or a laminate of such layers (invention 18), and is particularly preferably a laminate of a reflecting layer, a dielectric layer, a phase change layer and a dielectric layer (invention 19).

BEST MODE FOR CARRYING OUT THE INVENTION

Following is a description of embodiments of the present invention.

First Embodiment

Figure 1:
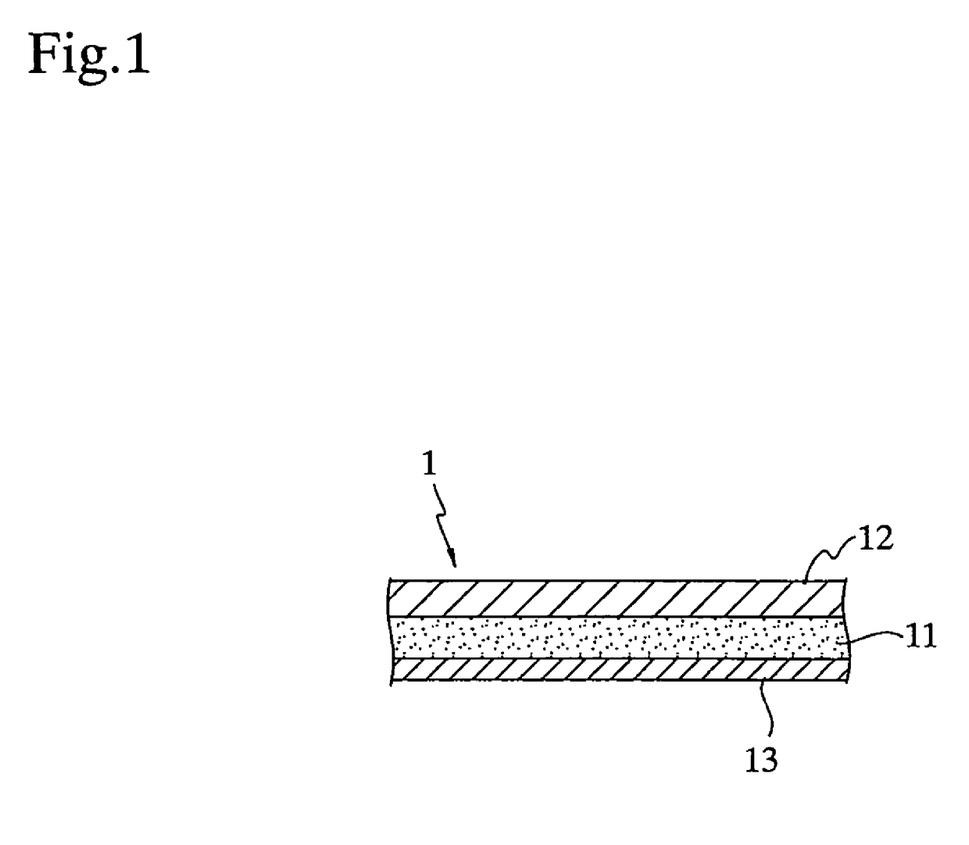
FIG. 1 is a sectional view of an optical disc-producing sheet according to a first embodiment of the present invention.
Figure 2:
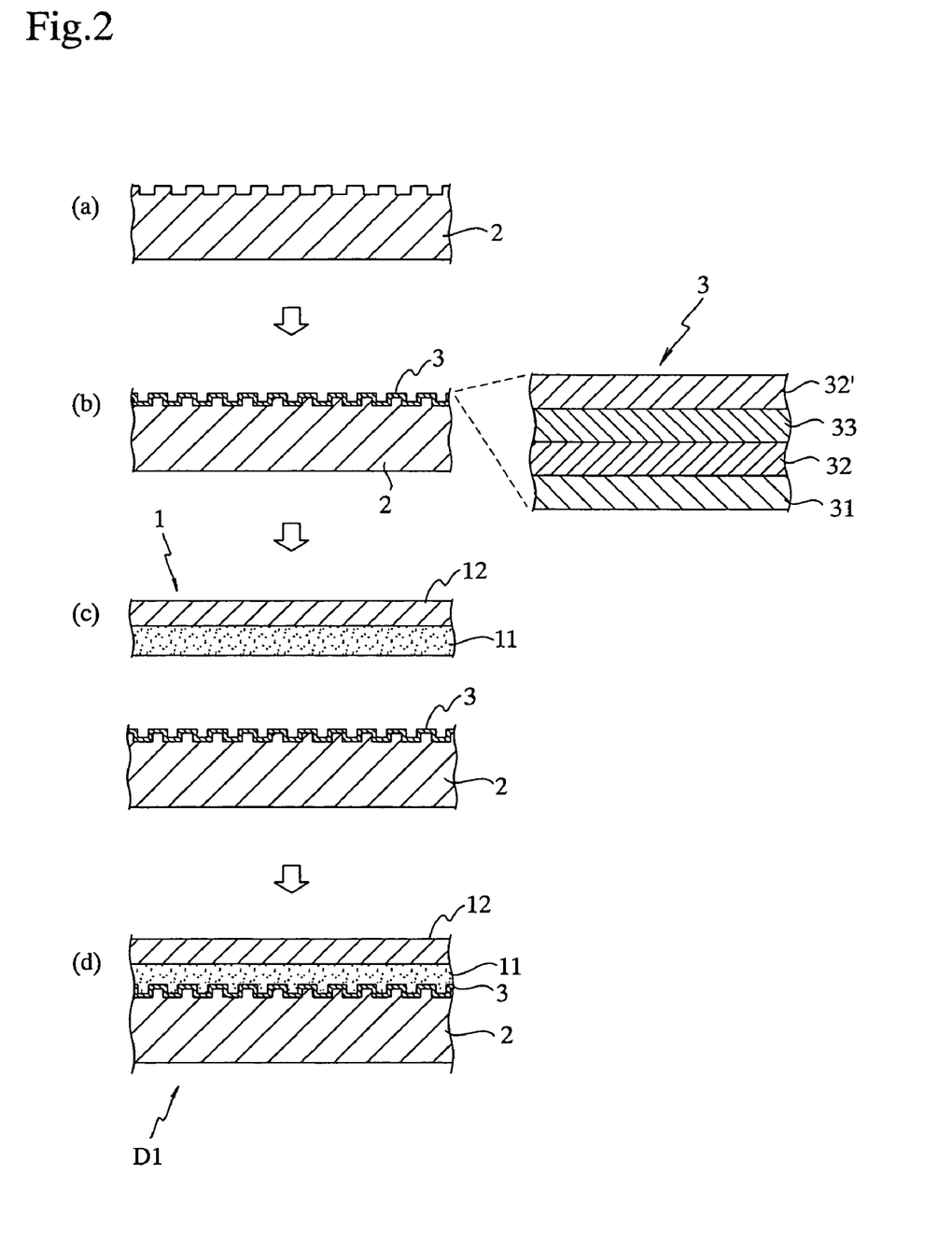
FIG. 2 is a sectional views showing an example of a method of producing a writable optical disc using the optical disc-producing sheet according to the first embodiment.

In the first embodiment, a description will be given of an optical disc-producing sheet for forming a protective sheet in an optical disc, which is a writable optical recording medium. FIG. 1 is a sectional view of the optical disc-producing sheet according to the first embodiment of the present invention, and FIGS. 2(a) to (d) are sectional views showing an example of a method of producing an optical disc using the optical disc-producing sheet according to the first embodiment.

As shown in FIG. 1, the optical disc-producing sheet 1 according to the first embodiment comprises an adhesive layer (curable layer) 11, a protective sheet (protective layer) 12 laminated on one surface of the adhesive layer 11 (the upper surface in FIG. 1), and a release sheet 13 laminated on the other surface of the adhesive layer 11 (the lower surface in FIG. 1). Note that the protective sheet 12 is to become the protective layer in the optical disc, and the release sheet 13 is peeled off when using the optical disc-producing sheet 1.

The adhesive layer 11 is for bonding together an information recording layer 3 formed on an optical disc substrate 2 (see FIG. 2) and the protective sheet 12, and is made of a curable adhesive having a specific heat capacity after curing of not more than 1.9 J/g·° C. at 80° C. Due to the adhesive layer 11 bonded to the information recording layer 3 having such a specific heat capacity, degradation of the optical disc D1 obtained due to the heat from a laser can be suppressed, and hence the repeat-characteristic (the characteristic of being able to reproduce recorded information accurately in the case that recording/erasure or reproduction of information has been carried out repeatedly) can be greatly improved.

The adhesive layer 11 preferably has a thermal conductivity after curing of at least 0.19 W/m·K at 80° C. Through the adhesive layer 11 having such a thermal conductivity, the effect of suppressing thermal degradation due to the adhesive layer 11 can be improved, and hence the repeat-characteristic can be made yet better.

The above-mentioned curable adhesive preferably exhibits pressure sensitive adhesiveness (tackiness) before curing, and strong adhesiveness after curing. Specifically, the adhesive layer 11 preferably has a storage elastic modulus before curing of from $10^3$ to $10^6$ Pa, particularly preferably from $10^4$ to $10^5$ Pa, and a storage elastic modulus after curing of at least $10^6$ Pa, particularly preferably from $10^7$ to $10^{10}$ Pa.

Note that the measurement temperature for the storage elastic modulus before curing is made to be the same as the temperature of the working environment when the optical disc-producing sheet 1 and the optical disc substrate 2 are placed together (compression-bonded). In general, the optical disc-producing sheet 1 and the optical disc substrate 2 are placed together at room temperature, and hence the storage elastic modulus is measured at room temperature. On the other hand, the measurement temperature for the storage elastic modulus after curing is made to be the same as the temperature of the storage environment for the optical disc obtained, i.e. room temperature.

If the storage elastic modulus of the adhesive layer 11 before curing is in a range as above, then the protective sheet 12 and the information recording layer 3 can easily be bonded together by compression-bonding the optical disc-producing sheet 1 onto the optical disc substrate 2. Moreover, if the storage elastic modulus of the adhesive layer 11 after curing is in a range as above, then the protective sheet 12 and the optical disc substrate 2 can be bonded and fixed together reliably, and hence the reliability of the optical disc D1 obtained in terms of strength, durability and so on can be maintained.

The adhesive layer 11 preferably has an energy ray-curable polymer component as a principal component thereof, but may instead have a mixture of a polymer component that is not energy ray-curable and an energy ray-curable polyfunctional monomer and/or oligomer as a principal component thereof.

Following is a description of the case that the adhesive layer 11 has an energy ray-curable polymer component as a principal component thereof.

The energy ray-curable polymer component in the adhesive layer 11 is preferably an acrylic ester copolymer having energy ray-curable groups on side chains thereof. Moreover, the acrylic ester copolymer is preferably an energy ray-curable copolymer (A) having energy ray-curable groups on side chains thereof and having a molecular weight of at least 100,000, obtained by reacting together an acrylic copolymer (a1) having functional group-containing monomer units and an unsaturated group-containing compound (a2) having a substituent that will bond to this functional group.

Here, the average of side chain introduction rate of the energy ray-curable groups is preferably from 0.1 to 20 mol %, particularly preferably from 5 to 15 mol %. If the average of side chain introduction rate of the energy ray-curable groups is less than 0.1 mol %, then it will not be possible to obtain the desired energy ray curability, whereas if the average of side chain introduction rate of the energy ray-curable groups is greater than 20 mol %, then warping of the optical disc may occur due to the volume reduction accompanying the curing of the adhesive layer 11.

The average of side chain introduction rate of the energy ray-curable groups is calculated using the following equation.

Average side chain introduction rate of energy ray-curable groups=(number of mols of energy ray-curable groups/total number of mols of monomers constituting acrylic copolymer)×100

The acrylic copolymer (a1) comprises constituent units derived from functional group-containing monomer, and constituent units derived from (meth) acrylic ester monomer or derivative thereof. Here, '(meth) acrylic ester monomer' in the present specification means acrylic ester monomer and/or methacrylic ester monomer.

The functional group-containing monomer in the acrylic copolymer (a1) is each a monomer having, in the molecule thereof, a polymerizable double bond, and a functional group such as a hydroxyl group, a carboxyl group, an amino group, a substituted amino group or an epoxy group; preferably, hydroxyl group-containing unsaturated compound and/or carboxyl group-containing unsaturated compound can be used.

Specific examples of such functional group-containing monomers are hydroxyl group-containing (meth)acrylates such as 2-hydroxyethyl acrylate, 2-hydroxyethyl methacrylate, 2-hydroxpropyl acrylate and 2-hydroxypropyl methacrylate, and carboxyl group-containing compounds such as acrylic acid, methacrylic acid and itaconic acid; these can be used singly, or two or more can be used in combination.

As the functional group-containing monomer, it is preferable to select one such that carboxyl groups will be present in the energy ray-curable copolymer. If carboxyl groups are present in the energy ray-curable copolymer, then the adhesive strength between the adhesive layer 11 and the information recording layer will be higher, and hence the strength and durability of the optical disc D1 obtained will be improved.

The amount of carboxyl groups present in the energy ray-curable copolymer is preferably from 0.01 to 30 mol %, more preferably from 0.5 to 20 mol %, in terms of the monomers. Note that in the case that the carboxyl groups and the unsaturated group-containing compound (a2), described later, react together (in the case that the functional group-containing monomer is carboxyl group-containing monomer), the carboxyl group content will be the value calculated based on:

(number of moles of carboxyl group-containing monomer)−(number of moles of unsaturated group-containing compound).

As each of the (meth)acrylic ester monomer in the acrylic copolymer (a1), a cycloalkyl (meth)acrylate, benzyl (meth)acrylate, or an alkyl (meth)acrylate in which the alkyl group has from 1 to 18 carbon atoms can be used. Out of these, it is particularly preferable to use an alkyl (meth) acrylate in which the alkyl group has from 1 to 18 carbon atoms, for example methyl (meth)acrylate, ethyl (meth)acrylate, propyl (meth)acrylate, n-butyl (meth)acrylate, 2-ethylhexyl (meth) acrylate or the like.

The acrylic copolymer (a1) generally contains the constituent units derived from the functional group-containing monomer in a proportion of from 3 to 100 wt %, preferably from 5 to 40 wt %, particularly preferably from 10 to 30 wt %, and generally contains the constituent units derived from the (meth) acrylic ester monomer or derivative thereof in a proportion of from 0 to 97 wt %, preferably from 60 to 95 wt %, particularly preferably from 70 to 90 wt %.

The acrylic copolymer (a1) is obtained by copolymerizing the functional group-containing monomer and the (meth) acrylic ester monomer or derivative thereof using an ordinary method, but in addition to these monomers, a small amount (e.g. not more than 10 wt %, preferably not more than 5 wt %) of dimethylacrylamide, vinyl formate, vinyl acetate, styrene or the like may also be included in the copolymerization.

The energy ray-curable copolymer (A) is obtained by reacting the acrylic copolymer (a1) having functional group-containing monomer units with the unsaturated group-containing compound (a2) having a substituent that will bond to the functional group.

The substituent possessed by the unsaturated group-containing compound (a2) can be selected as appropriate in accordance with the type of the functional group in the functional group-containing monomer units possessed by the acrylic copolymer (a1). For example, in the case that the functional group is a hydroxyl group, an amino group or a substituted amino group, an isocyanate group or an epoxy group is preferable as the substituent; in the case that the functional group is a carboxyl group, an isocyanate group, an aziridinyl group, an epoxy group or an oxazoline group is preferable as the substituent; in the case that the functional group is an epoxy group, an amino group, a carboxyl group or an aziridinyl group is preferable as the substituent. One such substituent is contained in each molecule of the unsaturated group-containing compound (a2).

Moreover, the unsaturated group-containing compound (a2) contains from 1 to 5, preferably 1 or 2, energy ray-polymerizable carbon-carbon double bonds in each molecule thereof. Specific examples of such unsaturated group-containing compounds (a2) include, for example, 2-methacryloyloxyethyl isocyanate, meta-isopropenyl-α,α-dimethylbenzyl isocyanate, methacryloyl isocyanate, and allyl isocyanate; acryloyl monoisocyanate compounds obtained by reacting together a diisocyanate compound or a polyisocyanate compound and hydroxyethyl (meth)acrylate; acryloyl monoisocyanate compounds obtained by reacting together a diisocyanate compound or a polyisocyanate compound, a polyol compound and hydroxyethyl (meth)acrylate; glycidyl (meth)acrylate; and (meth)acrylic acid, 2-(1-aziridinyl)ethyl (meth)acrylate, 2-vinyl-2-oxazoline, and 2-isopropenyl-2-oxazoline.

The unsaturated group-containing compound (a2) is generally used in a proportion of from 10 to 100 equivalents, preferably from 20 to 95 equivalents, particularly preferably from 25 to 90 equivalents, per 100 equivalents of the functional group-containing monomer of the acrylic copolymer (a1).

In the reaction between the acrylic copolymer (a1) and the unsaturated group-containing compound (a2), the reaction temperature, pressure, solvent, and time, and whether or not a catalyst is used and the type of the catalyst if used, can be selected as appropriate in accordance with the combination of functional group and substituent. As a result, the functional group present on the side chains of the acrylic copolymer (a1) reacts with the substituent in the unsaturated group-containing compound (a2), and hence the unsaturated group is introduced onto the side chains of the acrylic copolymer (a1), whereby the energy ray-curable copolymer (A) is obtained. The reaction ratio between the functional group and the substituent in the reaction is generally at least 70%, preferably at least 80%; unreacted functional groups may remain in the energy ray-curable copolymer (A).

The weight-average molecular weight of the energy ray-curable copolymer (A) obtained in this way is preferably at least 100,000, particularly preferably from 150,000 to 1,500,000, yet more preferably from 200,000 to 1,000,000.

Here, in the case of using ultraviolet rays as the energy rays, by adding a photopolymerization initiator (B) to the energy ray-curable copolymer (A), the polymerization curing time and the radiation amount can be reduced.

Specific examples of such photopolymerization initiators (B) include benzophenones, acetophenones, benzoin, benzoin methyl ether, benzoin ethyl ether, benzoin isopropyl ether, benzoin isobutyl ether, benzoyl benzoic acid, benzoyl methyl benzoate, benzoin dimethyl ketal, 2,4-diethylthioxanthone, 1-hydroxy cyclohexyl phenyl ketone, benzyl diphenyl sulfide, tetramethylthiuram monosulfide, azobisisobutyronitrile, benzyl, dibenzyl, diacetyl, β-chloroanthraquinone, (2,4,6-trimethylbenzyl-diphenyl)phosphine oxide, 2-benzothiazole-N,N-diethyldithiocarbamate, and oligo{2-hydroxy-2-methyl-1-[4-(1-propenyl)phenyl]propanone}. These may be used singly, or two or more may be used together. The photopolymerization initiator (B) is preferably used in an amount in a range of 0.1 to 10 parts by weight, particularly preferably 0.5 to 5 parts by weight, per 100 parts by weight of the energy ray-curable copolymer (A) (in the case of including an energy ray-curable polyfunctional monomer/oligomer component (D), described below, per 100 parts by weight of the total amount of the energy ray-curable copolymer (A) and the energy ray-curable polyfunctional monomer/oligomer component (D)).

In the adhesive layer 11, other components may be mixed in with the energy ray-curable copolymer (A) and the photopolymerization initiator (B) as appropriate. Examples of other components include polymer components or oligomer components (C) that are not energy ray-curable, energy ray-curable polyfunctional monomer/oligomer components (D), crosslinking agents (E), and other additives (F).

Examples of polymer components or oligomer components (C) that are not energy ray-curable include polyacrylic esters, polyesters, polyurethanes, polycarbonates, and polyolefins; a polymer or oligomer having a weight-average molecular weight of from 3,000 to 2,500,000 is preferable.

Examples of energy ray-curable polyfunctional monomer/oligomer components (D) include trimethylolpropane tri(meth)acrylate, pentaerythritol tri(meth)acrylate, pentaerythritol tetra(meth)acrylate, dipentaerythritol hexa(meth)acrylate, 1,4-butanediol di(meth)acrylate, 1,6-hexanediol di(meth)acrylate, polyethylene glycol di(meth)acrylates, polyester oligo(meth)acrylates, and polyurethane oligo(meth)acrylates.

As a crosslinking agent (E), a polyfunctional compound that will react with a functional group possessed by the energy ray-curable copolymer (A) or the like can be used. Examples of such polyfunctional compounds include isocyanate compounds, epoxy compounds, amine compounds, melamine compounds, aziridine compounds, hydrazine compounds, aldehyde compounds, oxazoline compounds, metal alkoxide compounds, metal chelate compounds, metal salts, ammonium salts, and reactive phenol resins.

Examples of other additives (F) include ultraviolet absorbers, antioxidants, tackifiers, dyes, and coupling agents.

By including such other components (C) to (F) in the adhesive layer 11, the tackiness and releasability before curing, the strength after curing, the adhesiveness to the other layers, the storage stability and so on can be improved. There are no particular limitations on the amount added of these other components, with this amount being set as appropriate within a range of 0 to 150 parts by weight per 100 parts by weight of the energy ray-curable copolymer (A).

Next, a description will be given of the case that the adhesive layer 11 has a mixture of a polymer component that is not energy ray-curable and energy ray-curable polyfunctional monomer or oligomer as a principal component thereof.

As the polymer component used in such an adhesive layer 11, for example a component as with the acrylic copolymer (a1) described earlier can be used. In such acrylic copolymers (a1), it is preferable to select an acrylic copolymer having a carboxyl group as the functional group, since then the adhesive strength between the adhesive layer 11 and the information recording layer 3 will be increased.

Moreover, as the energy ray-curable polyfunctional monomer or oligomer, one as with component (D) described earlier is selected. The mixing ratio between the polymer component and the energy ray-curable polyfunctional monomer or oligomer is preferably from 10 to 150 parts by weight, particularly preferably from 25 to 100 parts by weight, of the polyfunctional monomer or oligomer per 100 parts by weight of the polymer component.

Other additives (F) as described earlier can again be included in the adhesive layer 11. Regarding the amount added of the other additives (F), for example, the total amount of the other additives (F) is preferably from 0 to 50 parts by weight, particularly preferably from 0 to 20 parts by weight, per 100 parts by weight of the energy ray-curable copolymer (A).

Here, the thickness of the adhesive layer 11 is set in accordance with the depth of the concavity-convexity pattern (lands and grooves) formed on the optical disc substrate 2, but is generally approximately from 1 to 100 $\mu$m, preferably approximately from 5 to 30 $\mu$m.

The protective sheet 12 in the present embodiment is for protecting the information recording layer 3 in the optical disc D1, and constitutes the light-receiving surface of the optical disc D1.

The material of the protective sheet 12 should basically be one having sufficient optical transparency in the wavelength region of the light for reading information, but is also preferably one having suitable degrees of rigidity and flexibility so that the optical disc D1 can be produced easily, and is preferably one that is stable to temperature for storage of the optical disc D1. As such a material, for example a resin such as a polycarbonate, polymethyl methacrylate or polystyrene can be used.

The coefficient of linear expansion of the protective sheet 12 is preferably approximately the same as the coefficient of linear expansion of the optical disc substrate 2 so as not to bring about warping of the optical disc at high temperature. For example, in the case that the optical disc substrate 2 is made of a polycarbonate resin, it is preferable for the protective sheet 12 to be made of the same polycarbonate resin.

The thickness of the protective sheet 12 is set in accordance with the type of the optical disc D1, the thickness of the optical disc substrate 2, and so on, but is generally approximately from 25 to 300 $\mu$m, preferably approximately from 50 to 200 $\mu$m.

As the release sheet 13, a conventional publicly known one can be used. For example, a release sheet obtained by subjecting a film of a resin such as polyethylene terephthalate or polypropylene to release treatment with a silicone type release agent or the like can be used.

To make the adhesive layer 11 smooth, the side of the release sheet 13 that has been subjected to the release treatment (the side that contacts the adhesive layer 11) preferably has a surface roughness (Ra) of not more than 0.1 $\mu$m. Moreover, the thickness of the release sheet 13 is generally approximately from 10 to 200 $\mu$m, preferably approximately from 20 to 100 $\mu$m.

The optical disc-producing sheet 1 according to the present embodiment is obtained by preparing a coating agent containing a material for constituting the adhesive layer 11, and, if desired, also a solvent, applying the coating agent onto the protective sheet 12 using a coater such as a kiss roll coater, a reverse roll coater, a knife coater, a roll knife coater or a die coater, and then drying to form the adhesive layer 11, and then placing the release treated surface of the release sheet 13 on the surface of the adhesive layer 11, thus laminating the release sheet 13 and the adhesive layer 11 together, or else applying the coating agent onto the release treated surface of the release sheet 13, and then drying to form the adhesive layer 11, and then laminating the protective sheet 12 onto the surface of the adhesive layer 11.

Next, a description will be given of an example of a method of producing an optical disc D1 (single-sided one-layer type) using the optical disc-producing sheet 1 described above.

First, as shown in FIG. 2(a), an optical disc substrate 2 having thereon an concavity-convexity pattern comprising grooves and lands is produced. This optical disc substrate 2 is generally made of a polycarbonate, and can be formed using a molding method such as injection molding.

As shown in FIG. 2(b), an information recording layer 3 is then formed on the concavity-convexity pattern of the optical disc substrate 2. This information recording layer 3 is generally constituted from a layer made of an inorganic material or a laminate of such layers, and in particular is often constituted from a laminate comprising a reflecting layer 31, a dielectric layer 32, a phase change layer 33 and a dielectric layer 32' in this order from the bottom. These layers can be formed using means such as sputtering.

As the material of the reflecting layer 31, for example a metal such as Al, Ag, Au, Cu, Ta or W, or an alloy thereof, for example Al—Cr, Ag—Pt—Cu, Ag—Nd or the like in which Cr, Pt, Nd or the like has been added, can be used. The thickness of the reflecting layer 31 is generally approximately from 3 to 200 nm.

As the material of each of the dielectric layer 32 and the dielectric layer 32', for example a single one such as $SiO_2$, $ZnS$—$SiO_2$, $Si$—$SiO_2$, $TiO_2$, ZnO or MgO, or a combination thereof can be used. The thickness of each of the dielectric layer 32 and the dielectric layer 32' is generally approximately from 20 to 200 nm.

As the material of the phase change layer 33, for example a thin layer of a chalcogen alloy such as a Ge—Te, Ge—Te—Sb or Ge—Sn—Te alloy, or an Sb—Te eutectic thin layer or the like can be used. The thickness of the phase change layer 33 is generally approximately from 5 to 20 nm.

The information recording layer 3 may alternatively be a laminate comprising a reflecting layer and a dye layer from the bottom. Examples of the dye in the dye layer include, for example, polymethine type dyes, anthraquinone type dyes, cyanine type dyes, and phthalocyanine type dyes. The dye layer is formed by spin coating or the like, and generally has a thickness of approximately from 20 to 2000 nm.

In the present embodiment, in the case that the information recording layer 3 contains a phase change layer as described above in particular, an effect of suppressing thermal degradation of the optical disc due to the adhesive layer 11 is readily obtained.

Next, as shown in FIG. 2(c), the release sheet 13 of the optical disc-producing sheet 1 is peeled off and removed, thus exposing the adhesive layer (curable layer) 11, and then as shown in FIG. 2(d), the adhesive layer 11 is compression-bonded onto the surface of the information recording layer 3 on the optical disc substrate 2.

In this state, the adhesive layer 11 is irradiated with energy rays using an energy ray irradiating apparatus from either the side of the protective sheet (protective layer) 12 or the side of the optical disc substrate 2, thus curing the adhesive layer 11.

As the energy rays, in general ultraviolet rays, electron rays, or the like are used. The energy ray irradiation amount varies according to the type of the energy rays, but, for example, in the case of ultraviolet rays, approximately 100 to 500 mJ/cm$^2$ in terms of the amount of radiation is preferable, and in the case of electron rays, approximately 10 to 1000 krad is preferable.

In the optical disc D1 obtained as described above, the adhesive layer 11 adjacent to the information recording layer 3 has a specific heat capacity at 80° C. of not more than 1.9 J/g·° C., and hence degradation of the optical disc D1 through heat is suppressed, and thus the repeat-characteristic is better than with a conventional write once or rewritable optical disc.

Second Embodiment

Figure 3:
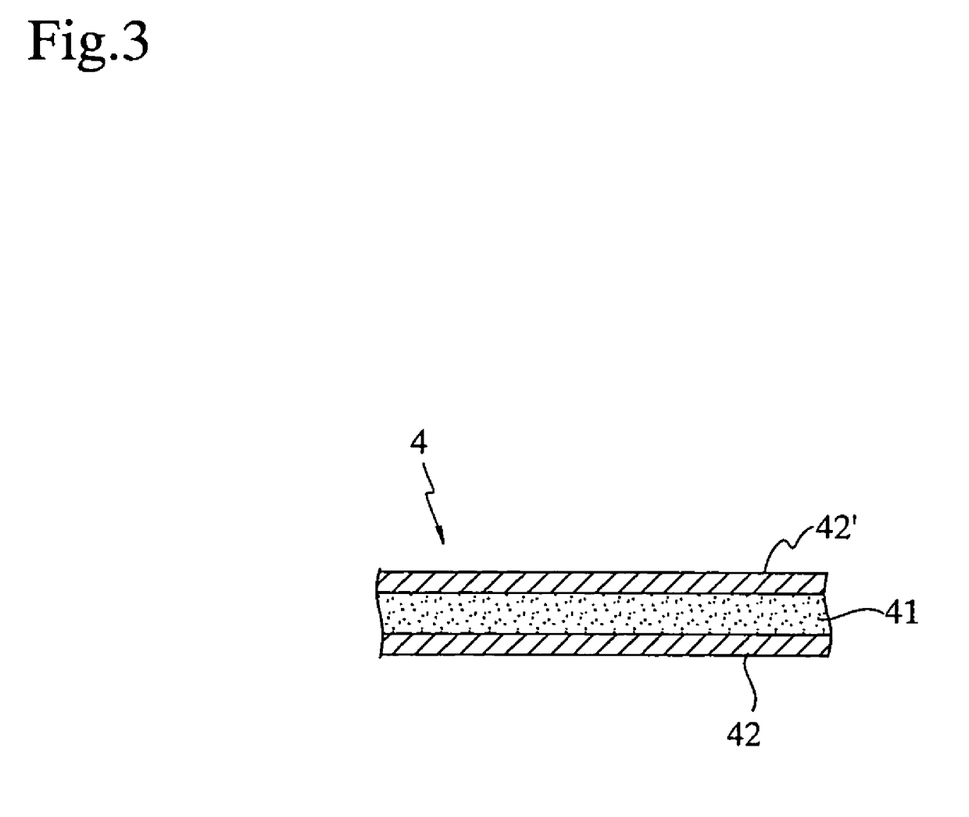
FIG. 3 is a sectional view of an optical disc-producing sheet according to a second embodiment of the present invention.
Figure 4:
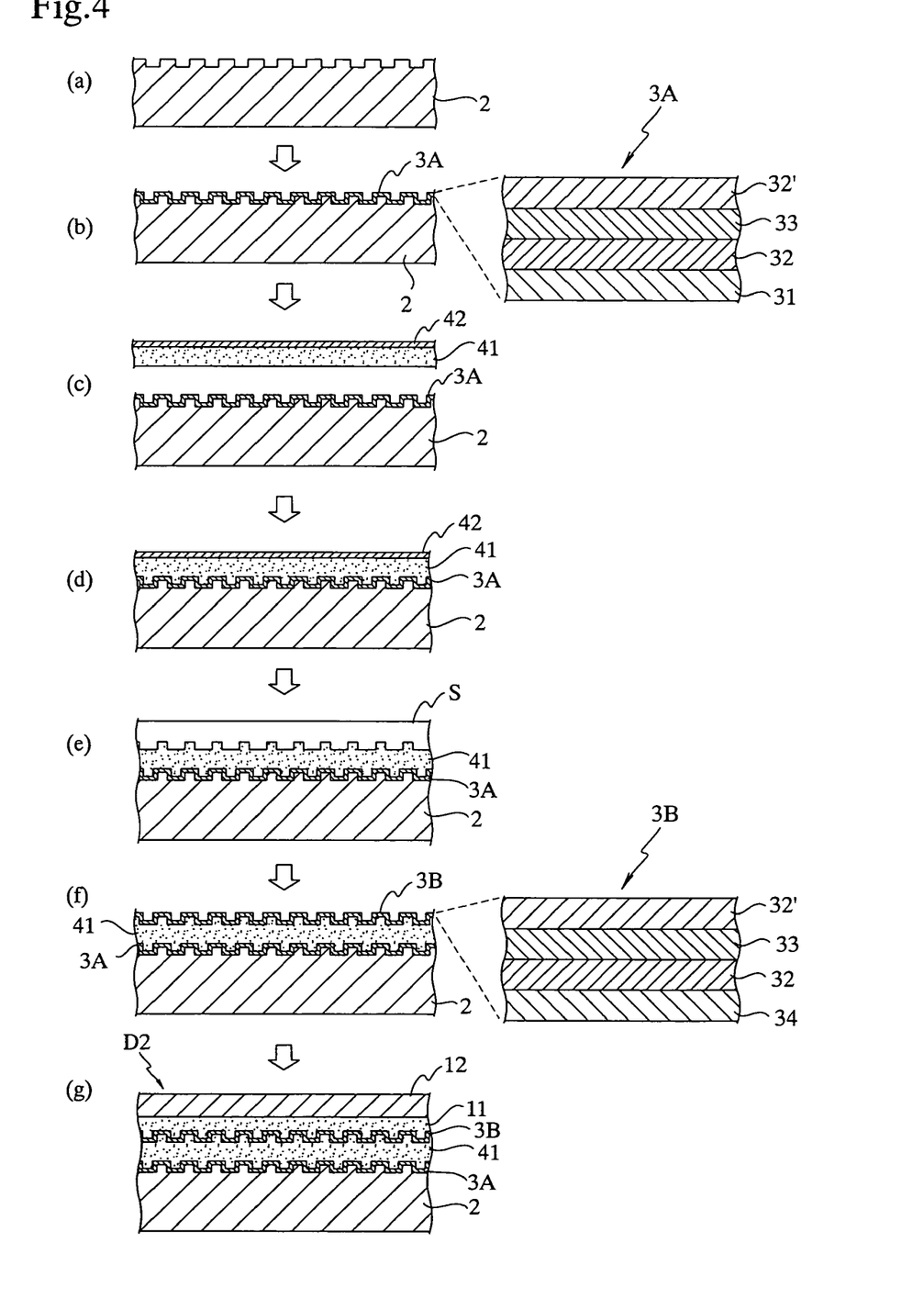
FIG. 4 is a sectional views showing an example of a method of producing a writable optical disc using the optical disc-producing sheet according to the second embodiment.

In the second embodiment, a description will be given of an optical disc-producing sheet having a stamper-receiving layer onto which the concavity-convexity pattern of a stamper will be transferred. FIG. 3 is a sectional view of the optical disc-producing sheet according to the second embodiment of the present invention, and FIGS. 4(a) to (g) are sectional views showing an example of a method of producing an optical disc using the optical disc-producing sheet according to the second embodiment.

As shown in FIG. 3, the optical disc-producing sheet 4 according to the second embodiment comprises a stamper-receiving layer (curable layer) 41, and release sheets 42 and 42' laminated on the two surfaces of the stamper-receiving layer 41. Note, however, that the release sheets 42 and 42' are peeled off when using the optical disc-producing sheet 4.

The stamper-receiving layer 41 is a layer onto which an concavity-convexity pattern formed on a stamper will be transferred to form lands and grooves, and is also a layer onto which information recording layers 3A and 3B will be formed or bonded. The stamper-receiving layer 41 is made of a curable material (polymeric material) having a specific heat capacity after curing of not more than 1.9 J/g·° C. at 80° C. Due to the stamper-receiving layer 41 adjacent to the information recording layers 3A and 3B having such a specific heat capacity, degradation of the optical disc D2 obtained due to the heat from a laser can be suppressed, and hence the repeat-characteristic can be greatly improved.

The stamper-receiving layer 41 preferably has a thermal conductivity after curing of at least 0.19 W/m·K at 80° C. Through the stamper-receiving layer 41 having such a thermal conductivity, the repeat-characteristic can be further improved.

As the curable polymeric material constituting the stamper-receiving layer 41, a material like the adhesive constituting the adhesive layer 11 of the optical disc-producing sheet 1 according to the first embodiment described earlier can be used; however, since the shape of the transferred concavity-convexity pattern must be maintained, the stamper-receiving layer 41 preferably has a storage elastic modulus after curing of at least 10$^8$ Pa, particularly preferably from 10$^8$ to 10$^{11}$ Pa. Moreover, the surface temperature of the stamper-receiving layer 41 may rise when forming the information recording layer 3B, and hence the glass transition temperature is preferably at least 80° C.

The thickness of the stamper-receiving layer 41 is set in accordance with the depth of the concavity-convexity pattern (lands and grooves) to be formed, but is generally approximately from 5 to 100 μm, preferably approximately from 5 to 60 μm.

The release sheets 42 and 42' can be similar to the release sheet 13 of the optical disc-producing sheet 1 according to the first embodiment described earlier, but as the release sheets 42 and 42', it is preferable to make the one that is peeled off first be of a light release type, and to make the one that is peeled off second be of a heavy release type.

The optical disc-producing sheet 4 according to the present embodiment is obtained by preparing a coating agent containing a material for constituting the stamper-receiving layer 41, and, if desired, also a solvent, applying the coating agent onto the release treated surface of the release sheet 42 using a coater such as a kiss roll coater, a reverse roll coater, a knife coater, a roll knife coater or a die coater, and then drying to form the stamper-receiving layer 41, and then placing the release treated surface of the other release sheet 42' onto the surface of the stamper-receiving layer 41, thus laminating the release sheet 42' and the stamper-receiving layer 41 together.

Next, a description will be given of an example of a method of producing an optical disc D2 (single-sided two-layer type) using the optical disc-producing sheet 4 described above and the optical disc-producing sheet 1 according to the first embodiment.

First, as shown in FIGS. 4(a) and (b), an optical disc substrate 2 having thereon an concavity-convexity pattern comprising grooves and lands is produced, and a first information recording layer 3A is formed on the concavity-convexity pattern of the optical disc substrate 2. Up to this step, the procedure can be similar to the method of producing the optical disc D1 in the first embodiment described earlier.

Next, as shown in FIG. 4(c), the release sheet 42' of the optical disc-producing sheet 4 is peeled off and removed, thus exposing the stamper-receiving layer 41, and then as shown in FIG. 4(d), the stamper-receiving layer (curable layer) 41 is compression-bonded onto the surface of the information recording layer 3A on the optical disc substrate 2. Then, as shown in FIG. 4(d), the release sheet 42 laminated on the stamper-receiving layer 41 is peeled off and removed, thus exposing the stamper-receiving layer 41.

Next, as shown in FIG. 4(e), a stamper S is pressed against the exposed surface of the stamper-receiving layer 41, thus transferring the concavity-convexity pattern of the stamper S onto the stamper-receiving layer 41. In this state, the stamper-receiving layer 41 is irradiated with energy rays using an energy ray irradiating apparatus from either the side of the stamper S or the side of the optical disc substrate 2, thus curing the stamper-receiving layer 41.

The stamper S is made of a metallic material such as a nickel alloy or a transparent resin material such as a norbornene resin. Note that the stamper S shown in FIG. 4(e) has a plate-like shape, but there is no limitation thereto, with a roller shape also being possible.

After the stamper-receiving layer 41 has been cured, the stamper S is separated away from the stamper-receiving layer 41. As a result, the concavity-convexity pattern of the stamper S is transferred onto and fixed on the stamper-receiving layer 41, whereby lands and grooves are formed, and then next, as shown in FIG. 4(f), a second information recording layer 3B is formed on the concavity-convexity pattern of the stamper-receiving layer 41. This second information recording layer 3B is generally constituted from a layer made of an inorganic material or a laminate of such layers, and in particular is often constituted from a laminate comprising a reflecting layer (translucent layer) 34, a dielectric layer 32, a phase change layer 33 and a dielectric layer 32' in this order from the bottom. Moreover, a dielectric layer may be further formed below the reflecting layer (translucent layer) 34. These layers can be formed using means such as sputtering.

As the material of the reflecting layer (translucent layer) 34, for example a metal such as Al, Ag, Au, Cu, Ta or W, or an alloy thereof, for example Al—Cr, Ag—Pt—Cu, Ag—Nd or the like in which Cr, Pt, Nd or the like has been added, can be used. The thickness of the reflecting layer (translucent layer) 34 is generally approximately from 3 to 20 nm. The materials of the layers other than the reflecting layer (translucent layer) 34 are as with the materials of the layers constituting the first information recording layer 3A, i.e. as with the materials of the layers constituting the information recording layer 3 of the optical disc D1 in the first embodiment described earlier.

In the present embodiment, in the case that the information recording layers 3A and 3B are made of materials as described above in particular, an effect of suppressing thermal degradation of the optical disc due to the stamper-receiving layer 41 and the adhesive layer 11 is readily obtained.

Finally, as shown in FIG. 4(g), the release sheet 13 of the optical disc-producing sheet 1 according to the first embodiment described earlier is peeled off and removed, thus exposing the adhesive layer 11, and then the adhesive layer 11 is compression-bonded onto the surface of the information recording layer 3B.

In this state, the adhesive layer 11 is irradiated with energy rays using an energy ray irradiating apparatus from either the side of the protective sheet 12 or the side of the optical disc substrate 2, thus curing the adhesive layer 11.

In the optical disc D2 obtained as described above, the stamper-receiving layer 41 adjacent to the information recording layers 3A and 3B and the adhesive layer 11 adjacent to the information recording layer 3B each has a specific heat capacity at 80° C. of not more than 1.9 J/g·° C., and hence degradation of the optical disc D2 due to the heat from a laser is suppressed, and thus the repeat-characteristic is better than with a conventional write once or rewritable optical disc.

Third Embodiment

Figure 5:
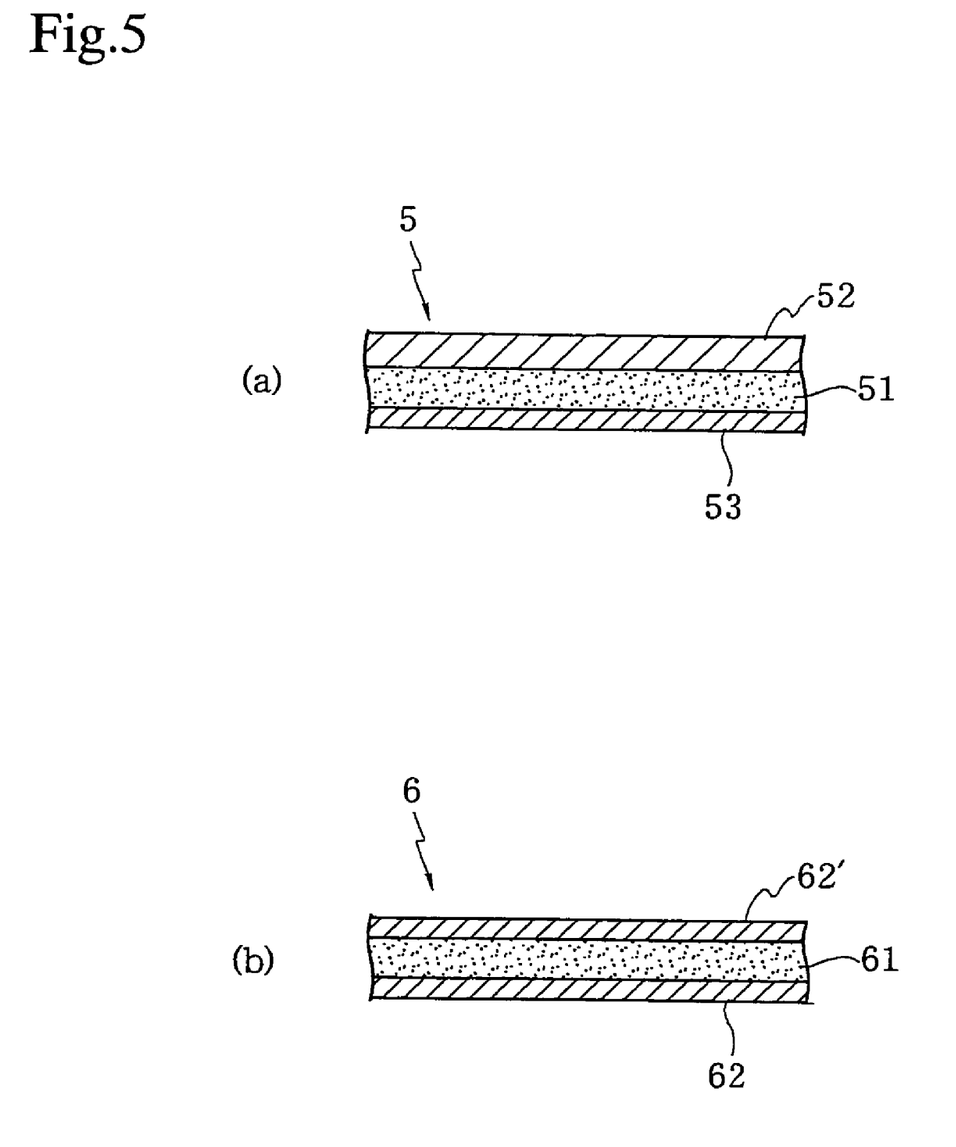
FIG. 5 is a sectional views of optical disc-producing sheets according to a third embodiment of the present invention.
Figure 6:
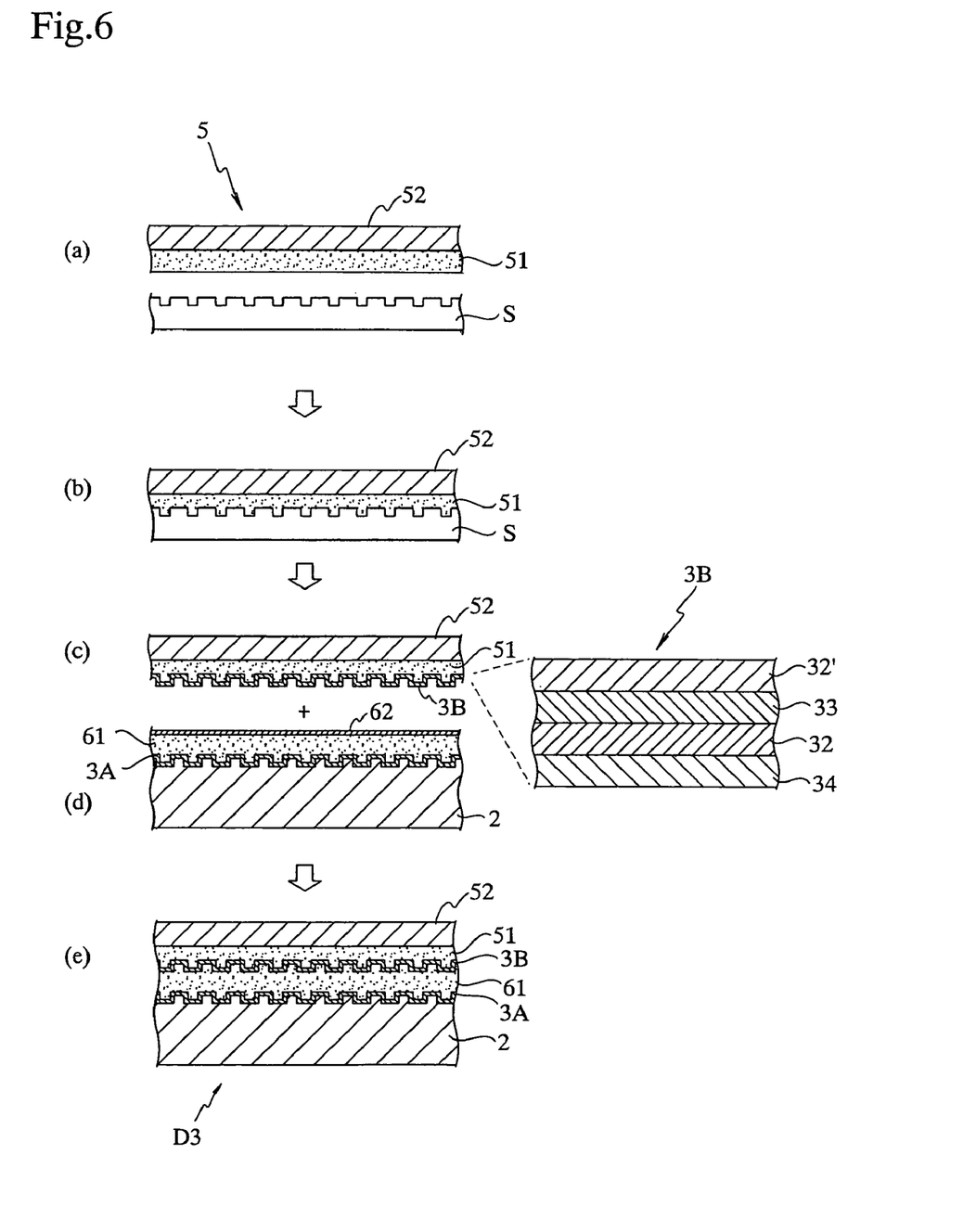
FIG. 6 is a sectional views showing an example of a method of producing a writable optical disc using the optical disc-producing sheets according to the third embodiment.

In the third embodiment, a description will be given of an optical disc-producing sheet for forming a protective sheet in a writable optical disc, this being an optical disc-producing sheet having a stamper-receiving layer onto which the concavity-convexity pattern of a stamper will be transferred, and an optical disc-producing sheet for bonding two information recording layers together. FIGS. 5(a) and (b) are sectional views of the optical disc-producing sheets according to the third embodiment of the present invention, and FIGS. 6(a) to (e) are sectional views showing an example of a method of producing an optical disc using the optical disc-producing sheets according to the third embodiment.

As shown in FIG. 5(a), a first optical disc-producing sheet 5 according to the present embodiment comprises a stamper-receiving layer (curable layer) 51, a protective sheet (protective layer) 52 laminated on one surface (the upper surface in FIG. 5) of the stamper-receiving layer 51, and a release sheet 53 laminated on the other surface (the lower surface in FIG. 5) of the stamper-receiving layer 51. Note, however, that the release sheet 53 is peeled off when using the optical disc-producing sheet 5.

The stamper-receiving layer 51 can be similar to the stamper-receiving layer 41 of the optical disc-producing sheet 4 according to the second embodiment described earlier. Moreover, the protective sheet 52 and the release sheet 53 can be similar to the protective sheet 12 and the release sheet 13 of the optical disc-producing sheet 1 according to the first embodiment described earlier.

The optical disc-producing sheet 5 can be produced using a similar method to with the optical disc-producing sheet 1 according to the first embodiment described earlier.

On the other hand, as shown in FIG. 5(b), a second optical disc-producing sheet 6 according to the present embodiment comprises an adhesive layer 61, and release sheets 62 and 62' laminated on the both surfaces of the adhesive layer 61. Note, however, that the release sheets 62 and 62' are peeled off when using the optical disc-producing sheet 6.

The adhesive layer 61 can be similar to the adhesive layer 11 of the optical disc-producing sheet 1 according to the first embodiment described earlier. Moreover, the release sheets 62 and 62' can be similar to the release sheets 42 and 42' of the optical disc-producing sheet 4 according to the second embodiment described earlier.

The optical disc-producing sheet 6 can be produced using a similar method to with the optical disc-producing sheet 4 according to the second embodiment described earlier.

Next, a description will be given of an example of a method of producing an optical disc D3 (single-sided two-layer type) using the first optical disc-producing sheet 5 and the second optical disc-producing sheet 6 described above.

First, as shown in FIGS. 6(a) and (b), the release sheet 53 of the first optical disc-producing sheet 5 is peeled off and removed, and then a stamper S is pressed against the stamper-receiving layer (curable layer) 51 thus exposed, thus transferring the concavity-convexity pattern of the stamper S onto the stamper-receiving layer 51. In this state, the stamper-receiving layer 51 is irradiated with energy rays using an energy ray irradiating apparatus from either the side of the stamper S or the side of the protective sheet 52, thus curing the stamper-receiving layer 51.

After the stamper-receiving layer 51 has been cured, the stamper S is separated away from the stamper-receiving layer 51. As a result, the concavity-convexity pattern of the stamper S is transferred onto and fixed on the stamper-receiving layer 51, whereby lands and grooves are formed, and then next, as shown in FIG. 6(c), a second information recording layer 3B is formed on the concavity-convexity pattern of the stamper-receiving layer 51. This second information recording layer 3B is generally constituted from a layer made of an inorganic material or a laminate of such layers, and in particular is often constituted from a laminate comprising a dielectric layer 32', a phase change layer 33, a dielectric layer 32 and a reflecting layer (translucent layer) 34 in this order from the top in FIG. 6. Moreover, a dielectric layer may be further formed on the upper side of the reflecting layer (translucent layer) 34. These layers can be formed using means such as sputtering. The materials of the various layers are as with the materials of the layers constituting the information recording layer 3B of the optical disc D2 in the second embodiment described earlier.

On the other hand, as shown in FIG. 6(d), using the second optical disc-producing sheet 6, a laminate comprising an optical disc substrate 2, an information recording layer 3A, the adhesive layer (curable layer) 61 and the release sheet 62 is produced as in the second embodiment (see FIGS. 4(a) to 4(d)).

As shown in FIG. 6(e), the release sheet 62 is peeled off from the laminate, thus exposing the adhesive layer 61, and then the adhesive layer 61 is placed on the second information recording layer 3B of the laminate on which the second information recording layer 3B has been formed (the laminate comprising protective sheet 52/stamper-receiving layer 51/information recording layer 3B), and the two laminates are compression-bonded together.

The adhesive layer 61 is then irradiated with energy rays using an energy ray irradiating apparatus from either the side of the protective sheet 52 or the side of the optical disc substrate 2, thus curing the adhesive layer 61.

In the optical disc D3 obtained as described above, the adhesive layer 61 bonded to the information recording layers 3A and 3B and the stamper-receiving layer 51 adjacent to the information recording layer 3B each has a specific heat capacity at 80° C. of not more than 1.9 J/g·° C., and hence degradation of the optical disc D3 due to the heat from a laser is suppressed, and thus the repeat-characteristic is better than with a conventional write once or rewritable optical disc.

The optical disc-producing methods described above are merely examples, and methods of producing optical discs using optical disc-producing sheets according to the present embodiments are not limited to these producing methods.

The embodiments described above have been described to aid understanding of the present invention, not to limit the present invention. The various elements disclosed in the embodiments described above are thus deemed to also include all design variations and equivalents falling under the technical scope of the present invention.

For example, the adhesive layer 11 of the optical disc D2 according to the second embodiment may alternatively be made of a publicly known adhesive, and the stamper-receiving layer 51 of the optical disc D3 according to the third embodiment may alternatively be made of a publicly known curable material.

Moreover, the release sheets 13, 42, 42', 53, 62 and 62' in the optical disc-producing sheets 1, 4, 5 and 6 may be omitted.

EXAMPLES

Following is a more detailed description of the present invention through working examples and so on; however, the scope of the present invention is not limited by these working examples and so on.

Example 1

80 parts by weight of n-butyl acrylate and 20 parts by weight of acrylic acid were subjected to reaction in an ethyl acetate/methyl ethyl ketone mixed solvent (weight ratio 50:50), thus obtaining an acrylic copolymer solution (solid concentration 35 wt %).

2-methacryloyloxyethyl isocyanate was added to the acrylic copolymer solution in an amount of 30 equivalents per 100 equivalents of acrylic acid in the copolymer, and reaction was carried out for 48 hours at 40° C. under a nitrogen atmosphere, thus obtaining an energy ray-curable copolymer having a weight-average molecular weight (Mw) of approximately 850,000 and having an average of side chain introduction rate of methacryloyl groups, which are energy ray-curable groups, of 9.2 mol %.

3.0 parts by weight of oligo{2-hydroxy-2-methyl-1-[4-(1-propenyl)phenyl]propanone} (ESACURE KIP 150, manufactured by Lamb erti s.p.a.) as a photopolymerization initiator, and 0.4 parts by weight of a metal chelate compound (ARUMIKIRETO D, manufactured by Kawaken Fine Chemicals Co., Ltd) as a crosslinking agent were added to 100 parts by weight in terms of solids of the energy ray-curable copolymer solution obtained, and the solid concentration was adjusted to approximately 25 wt %, thus obtaining an adhesive layer coating agent.

The adhesive layer coating agent obtained was applied using a knife coater such that the thickness of the dried film would be 22 μm onto the release treated surface of a release sheet (SP-PET3811, manufactured by LINTEC Corporation, thickness: 38 μm, surface roughness (Ra): 0.016 μm) that had been obtained by subjecting one surface of a polyethylene terephthalate film to release treatment with a silicone resin, and then drying was carried out for 1 minute at 90° C., thus forming an adhesive layer.

This adhesive layer, and a polycarbonate film (Pure-Ace C110-78, manufactured by Teijin Ltd., thickness: 78 μm) as a protective sheet were stuck together, thus obtaining an optical disc-producing sheet A.

Example 2

4.0 parts by weight of oligo{2-hydroxy-2-methyl-1-[4-(1-propenyl)phenyl]propanone} (ESACURE KIP 150, manufactured by lamberti spa) as a photopolymerization initiator, 100 parts by weight of a composition comprising an energy ray-curable polyfunctional monomers and energy ray-curable polyfunctional oligomers (Seika-Beam 14-29B, manufactured by Dainichiseika Color & Chemicals Mfg. Co., Ltd.), and 1.2 parts by weight of a polyisocyanate crosslinking agent (Oribain BPS-8515, manufactured by Toyo Ink Manufacturing Co., Ltd.) were added to 100 parts by weight in terms of solids of an energy ray-curable copolymer solution obtained as in Example 1, and the solid concentration was adjusted to approximately 40 wt % thus obtaining a stamper-receiving layer coating agent.

Moreover, a heavy release type release sheet (SP-PET3811, manufactured by LINTEC Corporation, thickness: 38 μm, surface roughness (Ra): 0.016 μm) that had been obtained by subjecting one surface of a polyethylene terephthalate film to release treatment with a heavy release type silicone resin, and a light release type release sheet (SP-PET38GS, manufactured by LINTEC Corporation, thickness: 38 μm, surface roughness (Ra): 0.016 μm) that had been obtained by subjecting one surface of a polyethylene terephthalate film to release treatment with a light release type silicone resin were prepared.

The stamper-receiving layer coating agent was applied using a knife coater onto the release treated surface of the heavy release type release sheet such that the thickness of the dried film would be 22 μm, and then drying was carried out for 1 minute at 90° C., thus forming a stamper-receiving layer. The light release type release sheet was then laminated onto the surface of this stamper-receiving layer, thus obtaining an optical disc-producing sheet B.

Example 3

5.0 parts by weight of 1-hydroxy cyclohexyl phenyl ketone (Irgacure 184, manufactured by Ciba Specialty Chemicals Inc.) as a photopolymerization initiator, 100 parts by weight of dipentaerythritol hexaacrylate (KAYARAD DPHA, manufactured by Nippon Kayaku Co., Ltd.) as an energy ray-curable polyfunctional monomer, and 0.7 parts by weight of a metal chelate compound (ARUMIKIRETO D, manufactured by Kawaken Fine Chemicals Co., Ltd) as a crosslinking agent were added to 100 parts by weight in terms of solids of an energy ray-curable copolymer solution obtained as in Example 1, and the solid concentration was adjusted to approximately 40 wt %, thus obtaining a stamper-receiving layer coating agent.

Using the stamper-receiving layer coating agent obtained, an optical disc-producing sheet C was obtained using a similar method to in Example 2.

Comparative Example 1

75 parts by weight of n-butyl acrylate, 22 parts by weight of ethyl acrylate, 3 parts by weight of acrylic acid, and 0.5 parts by weight of 2-hydroxyethyl acrylate were subjected to reaction in an ethyl acetate solvent, thus obtaining a solution of an acrylic copolymer having a weight-average molecular weight (Mw) of approximately 800,000 (solid concentration 30 wt %).

0.6 parts by weight of a metal chelate compound (ARUMIKIRETO D, manufactured by Kawaken Fine Chemicals Co., Ltd) as a crosslinking agent was added to 100 parts by weight in terms of solids of the acrylic copolymer solution, and the solid concentration was adjusted to approximately 25 wt %, thus obtaining an adhesive layer coating agent.

Using the adhesive layer coating agent obtained, an optical disc-producing sheet D was obtained using a similar method to in Example 1.

Comparative Example 2

4.0 parts by weight of oligo{2-hydroxy-2-methyl-1-[4-(1-propenyl)phenyl]propanone} (ESACURE KIP 150, manufactured by lamberti spa) as a photopolymerization initiator, 100 parts by weight of an energy ray-curable bifunctional epoxy acrylate oligomer (KAYARAD UX-3204, manufactured by Nippon Kayaku Co., Ltd.), and 1.2 parts by weight of a polyisocyanate crosslinking agent (Oribain BPS-8515, manufactured by Toyo Ink Manufacturing Co., Ltd.) were added to 100 parts by weight in terms of solids of an energy ray-curable copolymer solution obtained as in Example 1, and the solid concentration was adjusted to approximately 40 wt %, thus obtaining a stamper-receiving layer coating agent.

Using the stamper-receiving layer coating agent obtained, an optical disc-producing sheet E was obtained using a similar method to in Example 2.

Comparative Example 3

80 parts by weight of n-butyl acrylate and 20 parts by weight of acrylic acid were subjected to reaction in an ethyl acetate/methyl ethyl ketone mixed solvent (weight ratio 50:50), thus obtaining a solution of an acrylic copolymer having a weight-average molecular weight (Mw) of approximately 850,000 (solid concentration 30 wt %).

5.0 parts by weight of 1-hydroxy cyclohexyl phenyl ketone (Irgacure 184, manufactured by Ciba Specialty Chemicals Inc.) as a photopolymerization initiator, 100 parts by weight of dipentaerythritol hexaacrylate (KAYARAD DPHA, manufactured by Nippon Kayaku Co., Ltd.) as an energy ray-curable polyfunctional monomer, and 0.7 parts by weight of a metal chelate compound (ARUMIKIRETO D, manufactured by Kawaken Fine Chemicals Co., Ltd) as a crosslinking agent were added to 100 parts by weight in terms of solids of the acrylic copolymer solution, and the solid concentration was adjusted to approximately 40 wt %, thus obtaining a stamper-receiving layer coating agent.

Using the stamper-receiving layer coating agent obtained, an optical disc-producing sheet F was obtained using a similar method to in Example 2.

Test Example 1

The storage elastic modulus before curing of the adhesive layer or stamper-receiving layer of each of the optical disc-producing sheets A to F produced in Examples 1 to 3 and Comparative Examples 1 to 3 was measured at 25° C. at 1 Hz using a viscoelasticity measuring apparatus (manufactured by Rheometrics, apparatus name: Dynamic Analyzer RDA II). The results are shown in Table 1.

Moreover, each adhesive layer or stamper-receiving layer was cured by irradiating with ultraviolet rays (using an Adwill RAD-2000 m/8 apparatus manufactured by LINTEC Corporation; irradiation conditions: intensity 310 mW/cm$^2$, amount of radiation 300 mJ/cm$^2$), and then the storage elastic modulus of the adhesive layer or stamper-receiving layer was measured at 25° C. at 3.5 Hz using a viscoelasticity measuring apparatus (manufactured by KK Orientech, apparatus name: Rheovibron DDV-II-EP). The results are shown in Table 1.

Furthermore, the specific heat capacity of the cured adhesive layer or stamper-receiving layer in each of the optical disc-producing sheets A to F was measured using a differential scanning calorimeter (DSC; Pyrisl, manufactured by PerkinElmer, Inc.) at a heating rate of 20° C./min in accordance with JIS K7123. The results are shown in Table 1.

Test Example 2

Using the adhesive layer coating agent or stamper-receiving layer coating agent obtained in each of Examples 1 to 3 and Comparative Examples 1 to 3, a curable layer of thickness 20 μm was formed between two release sheets using a similar method to in Example 2. The laminate obtained was irradiated with ultraviolet rays as in Test Example 1 to cure the curable layer, and then a piece of size 50 mm×50 mm was cut out from the laminate and taken as a test sample.

The thermal conductivity at 80° C. was measured both for the test samples and for the release sheets, and the thermal conductivity at 80° C. of each curable layer after curing was calculated from these thermal conductivity values. The thermal conductivity measurements were carried out by laminating together five of each sample or release sheet and using a temperature gradient method with a thermal conductivity measuring apparatus (model ARC-TC-1, manufactured by AGUNE). Note that to eliminate the effects of air within the laminate for each sample or release sheet, grease having a high thermal conductivity was applied on. The results are shown in Table 1.

Manufacturing Example 1

A polycarbonate optical disc substrate of thickness 1.1 mm, outside diameter 120 mm and inside diameter 15 mm having guide grooves formed on one side thereof at a pitch of 0.32 μm was molded by injection molding. A reflecting layer made of an alloy of Ag and Au, a dielectric layer made of Zn—$SiO_2$, a phase change layer made of Ge—Sb—Te (2:2:5) and a dielectric layer made of Zn—$SiO_2$ were formed in this order using a sputtering apparatus on the surface of the optical disc substrate on the side on which the guide grooves had been formed, thus obtaining an information recording layer.

An optical disc-producing sheet A as produced in Example 1 was cut to the same shape as the optical disc substrate in advance by punching, and then the release sheet was peeled off, and the adhesive layer thus exposed was laminated onto the information recording layer (dielectric layer) on the optical disc substrate, and compression bonding was carried out with a pressure of 29 N.

Next, irradiation with ultraviolet rays (using an Adwill RAD-2000 m/8 apparatus manufactured by LINTEC Corporation; irradiation conditions: intensity 310 mW/$cm^2$, amount of radiation 300 mJ/$cm^2$) was carried out from the side of the protective sheet, thus curing the adhesive layer and hence obtaining a rewritable optical disc A.

Manufacturing Example 2

An optical disc substrate was molded and an information recording layer formed as in Manufacturing Example 1.

An optical disc-producing sheet B as produced in Example 2 was cut to the same shape as the optical disc substrate in advance by punching, and then the light release type release sheet was peeled off, and the stamper-receiving layer thus exposed was laminated onto the information recording layer (dielectric layer) on the optical disc substrate, and compression bonding was carried out with a pressure of 29 N.

Next, the heavy release type release sheet was peeled off from the stamper-receiving layer, and a stamper made of a resin (Zeonor, manufactured by Zeon Corporation) was placed onto the stamper-receiving layer thus exposed and compression was carried out with a pressure of 29 N, thus transferring the concavity-convexity pattern of the stamper onto the stamper-receiving layer. Next, irradiation with ultraviolet rays (using an Adwill RAD-2000 m/8 apparatus manufactured by LINTEC Corporation; irradiation conditions: intensity 310 mW/$cm^2$, amount of radiation 300 mJ/$cm^2$) was carried out from the side of the optical disc substrate, thus curing the stamper-receiving layer, and hence fixing the concavity-convexity pattern.

The stamper was separated away from the stamper-receiving layer, and then a dielectric layer made of Zn—$SiO_2$, a translucent layer made of an alloy of Ag and Au, a dielectric layer made of Zn—$SiO_2$, a phase change layer made of Ge—Sb—Te (2:2:5) and a dielectric layer made of Zn—$SiO_2$ were formed in this order using a sputtering apparatus on the surface of the stamper-receiving layer, thus obtaining a translucent information recording layer.

Moving on, an optical disc-producing sheet A as produced in Example 1 was cut to the same shape as the optical disc substrate in advance by punching, and then the release sheet was peeled off, laminating onto the dielectric layer was carried out, and compression bonding was carried out with a pressure of 29 N.

Next, irradiation with ultraviolet rays (using an Adwill RAD-2000 m/8 apparatus manufactured by LINTEC Corporation; irradiation conditions: intensity 310 mW/$cm^2$, amount of radiation 300 mJ/$cm^2$) was carried out from the side of the protective sheet, thus curing the adhesive layer and hence obtaining a rewritable optical disc B.

Manufacturing Example 3

A rewritable optical disc C was produced as in Manufacturing Example 2, except that an optical disc-producing sheet C as produced in Example 3 was used instead of an optical disc-producing sheet B as produced in Example 2.

Manufacturing Example 4

A rewritable optical disc D was produced as in Manufacturing Example 1, except that an optical disc-producing sheet D as produced in Comparative Example 1 was used instead of an optical disc-producing sheet A as produced in Example 1.

Manufacturing Example 5

A rewritable optical disc E was produced as in Manufacturing Example 2, except that an optical disc-producing sheet E as produced in Comparative Example 2 was used instead of an optical disc-producing sheet B as produced in Example 2.

Manufacturing Example 6

A rewritable optical disc F was produced as in Manufacturing Example 2, except that an optical disc-producing sheet F as produced in Comparative Example 3 was used instead of an optical disc-producing sheet B as produced in Example 2.

Test Example 3

For each of the rewritable optical discs A to F obtained in Manufacturing Examples 1 to 6, the jitter value upon carrying out overwriting was measured. The measurement conditions were as follows.

Laser wavelength: 405 nm
Numerical aperture of object lens: 0.85
Linear velocity: 5 m/s
Modulation method: (1–7) modulation The jitter increase rate ($\Delta J$) upon carrying out overwriting from 100 to 2000 times under the above measurement conditions is shown in Table 1.

TABLE 1

| | Specific heat capacity | Thermal conductivity | Storage modulus (Pa) | | Jitter increase rate $\Delta J$ |
|---|---|---|---|---|---|
| | (80° C.) [J/g · ° C.] | (80° C.) [W/m · K] | Before curing | After curing | |
| Example 1 | 1.86 | 0.19 | $1.14 \times 10^4$ | $2.59 \times 10^8$ | 0.20 |
| Example 2 | 1.82 | 0.22 | $7.42 \times 10^4$ | $1.62 \times 10^9$ | 0.10 |
| Example 3 | 1.75 | 0.20 | $7.25 \times 10^4$ | $5.54 \times 10^9$ | 0.15 |
| Comparative Example 1 | 2.00 | 0.17 | $1.86 \times 10^5$ | $1.86 \times 10^5$ | 1.10 |
| Comparative Example 2 | 2.07 | 0.19 | $3.13 \times 10^4$ | $1.09 \times 10^{10}$ | 1.10 |
| Comparative Example 3 | 2.16 | 0.17 | $5.10 \times 10^4$ | $7.94 \times 10^7$ | 0.90 |

As can be seen from Table 1, in the case that the specific heat capacity of the adhesive layer or stamper-receiving layer at 80° C. after curing is not more than 1.9 J/g·° C, the jitter increase rate is low, i.e. the repeat recording characteristic is excellent.

INDUSTRIAL APPLICABILITY

According to the present invention, an optical recording medium can be obtained for which recorded information can be reproduced accurately even in the case that recording/erasure or reproduction of information has been carried out repeatedly. The present invention is thus suitable for an optical recording medium for which recording/erasure or reproduction of information is carried out repeatedly.

What is claimed is:

1. An optical recording medium-producing sheet, comprising a curable layer that has a specific heat capacity after curing of not more than 1.9 J/g·° C. at 80° C., as a layer to be adjacent to an information recording layer in a writable optical recording medium.

2. The optical recording medium-producing sheet according to claim 1, wherein said curable layer has a thermal conductivity after curing of at least 0.19 W/m·K at 80° C.

3. The optical recording medium-producing sheet according to claim 1, wherein said information recording layer is a layer made of an inorganic material or a laminate of the layers.

4. The optical recording medium-producing sheet according to claim 1, wherein said information recording layer is a laminate of a reflecting layer, a dielectric layer, a phase change layer and a dielectric layer.

5. The optical recording medium-producing sheet according to claim 1, wherein said curable layer is formed on a protective layer.

6. The optical recording medium-producing sheet according to claim 1, wherein said curable layer is a stamper-receiving layer.

7. The optical recording medium-producing sheet according to claim 1, wherein said curable layer has a storage elastic modulus before curing of from $10^3$ to $10^6$ Pa, and has a storage elastic modulus after curing of at least $10^6$ Pa.

8. The optical recording medium-producing sheet according to claim 1, wherein said curable layer has an energy ray-curable material as a principal component thereof.

9. The optical recording medium-producing sheet according to claim 8, wherein said energy ray-curable material is an acrylic ester copolymer having energy ray-curable groups on side chains thereof.

10. The optical recording medium-producing sheet according to claim 9, wherein an average of side chain introduction rate of said energy ray-curable groups is from 0.1 to 20 mol %.

11. The optical recording medium-producing sheet according to claim 9, wherein said energy ray-curable groups are unsaturated groups, and said acrylic ester copolymer has a weight-average molecular weight of at least 100,000.

12. The optical recording medium-producing sheet according to claim 8, wherein said energy ray-curable material is a mixture of an acrylic ester copolymer having energy ray-curable groups on side chains thereof, and an energy ray-curable polyfunctional monomer and/or oligomer.

13. A writable optical recording medium produced using the optical recording medium-producing sheet according to any of claims 1 through 12.

14. A writable optical recording medium, comprising:
   an information recording layer; and
   a layer adjacent to said information recording layer having a specific heat capacity of not more than 1.9 J/g·° C. at 80° C.

15. The writable optical recording medium according to claim 14, wherein said layer adjacent to said information recording layer has a thermal conductivity of at least 0.19 W/m·K at 80° C.

16. The writable optical recording medium according to claim 14, further comprising a protective layer, wherein said layer adjacent to said information recording layer is an adhesive layer that bonds said information recording layer and said protective layer together.

17. The writable optical recording medium according to claim 14, wherein said layer adjacent to said information recording layer is a stamper-receiving layer, and said information recording layer is formed on at least one side of said stamper-receiving layer.

18. The writable optical recording medium according to claim 14, wherein said information recording layer is a layer made of an inorganic material or a laminate of such layers.

19. The writable optical recording medium according to claim 14, wherein said information recording layer is a laminate of a reflecting layer, a dielectric layer, a phase change layer and a dielectric layer.

* * * * *